(12) United States Patent
Fujimura et al.

(10) Patent No.: US 11,917,438 B2
(45) Date of Patent: Feb. 27, 2024

(54) USER DEVICE AND BASE STATION DEVICE

(71) Applicant: NTT DOCOMO, INC., Tokyo (JP)

(72) Inventors: Naoki Fujimura, Tokyo (JP); Takuma Takada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 389 days.

(21) Appl. No.: 17/290,909

(22) PCT Filed: Nov. 9, 2018

(86) PCT No.: PCT/JP2018/041752
§ 371 (c)(1),
(2) Date: May 3, 2021

(87) PCT Pub. No.: WO2020/095455
PCT Pub. Date: May 14, 2020

(65) Prior Publication Data
US 2021/0392536 A1    Dec. 16, 2021

(51) Int. Cl.
*H04W 24/10*    (2009.01)
*H04W 24/08*    (2009.01)

(52) U.S. Cl.
CPC .......... *H04W 24/10* (2013.01); *H04W 24/08* (2013.01)

(58) Field of Classification Search
CPC ......... H04W 24/08; H04L 12/28; H04L 12/50
USPC ...................................... 37/329.4, 402, 403
See application file for complete search history.

(56) References Cited

U.S. PATENT DOCUMENTS

| 9,219,585 B2 * | 12/2015 | Kawasaki ............... H04L 5/005 |
| 2012/0033595 A1 | 2/2012 | Aoyama et al. |
| 2012/0044822 A1 | 2/2012 | Kim et al. |
| 2016/0262174 A1 | 9/2016 | Fujishiro et al. |

FOREIGN PATENT DOCUMENTS

| GB | 2489770 A | 10/2012 |
| JP | 2009-284252 A | 12/2009 |
| WO | 2010/105416 A1 | 9/2010 |
| WO | 2010/122771 A1 | 10/2010 |
| WO | 2015/046266 A1 | 4/2015 |

OTHER PUBLICATIONS

Extended European Search Report issued in counterpart European Patent Application No. 18939251.7, dated May 30, 2022 (11 pages).

(Continued)

*Primary Examiner* — Dang T Ton
(74) *Attorney, Agent, or Firm* — Osha Bergman Watanabe & Burton LLP

(57) ABSTRACT

A user device includes a receiving unit that receives from a base station device a measurement configuration including a condition for triggering a measurement report; a control unit that executes a measurement based on the measurement configuration; and a transmitting unit that transmits a measurement report to the base station device in response to the condition for triggering a measurement report being met, wherein the control unit modifies the measurement configuration based on a parameter indicating mobility capability or based on a type of user device.

5 Claims, 8 Drawing Sheets

(56) References Cited

OTHER PUBLICATIONS

Notice of Reasons for Refusal issued in Japanese Application No. 2020-556461 dated Oct. 18, 2022 (6 pages).
International Search Report issued in Application No. PCT/JP2018/041752, dated Jan. 15, 2019 (4 pages).
Written Opinion issued in International Application No. PCT/JP2018/041752, dated Jan. 15, 2019 (6 pages).
3GPP TS 38.300 V15.3.0, Release 15; "3rd Generation Partnership Project; Technical Specification Group Radio Access Network; NR; NR and NG-RAN Overall Description; Stage 2;" Sep. 2018; Sophia Antipolis Valbonne, France (92 pages).
3GPP TS 38.133 V15.3.0, Release 15; "3rd Generation Partnership Project; Technical Specification Group Radio Access Network; NR; Requirements for support of radio resource management;" Sep. 2018; Sophia Antipolis Valbonne, France (136 pages).
Office Action issued in the counterpart Chinese Patent Application No. 201880099228.7, dated May 27, 2023 (15 pages).
Office Action issued in the counterpart Chinese Application No. 201880099228.7, dated Oct. 14, 2023 (15 pages).

* cited by examiner

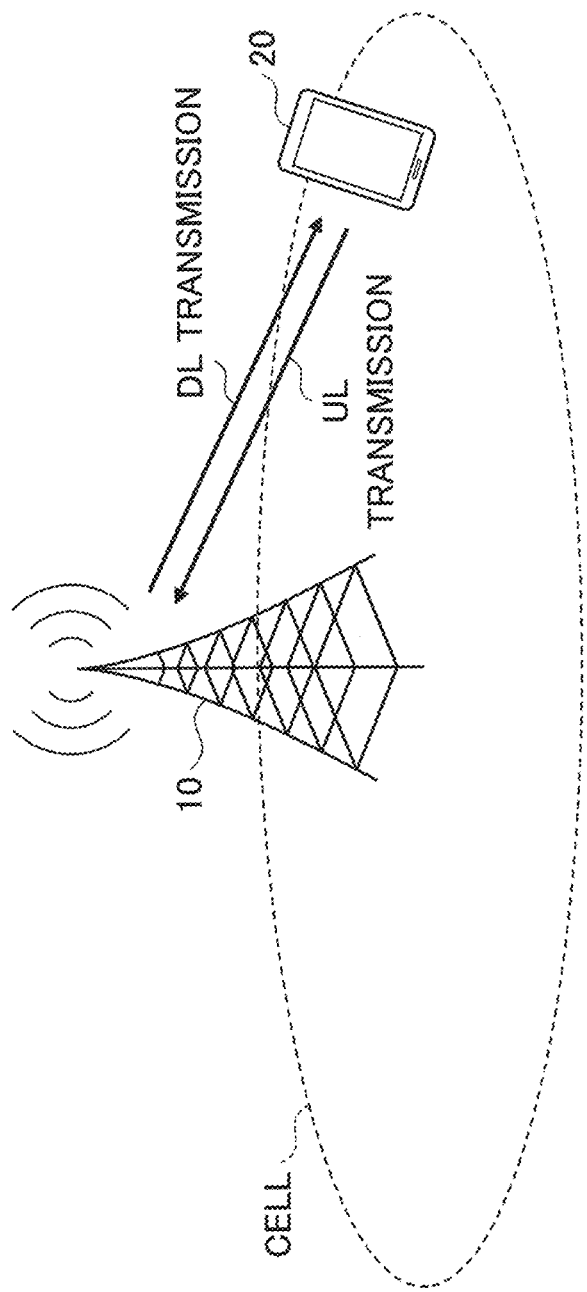

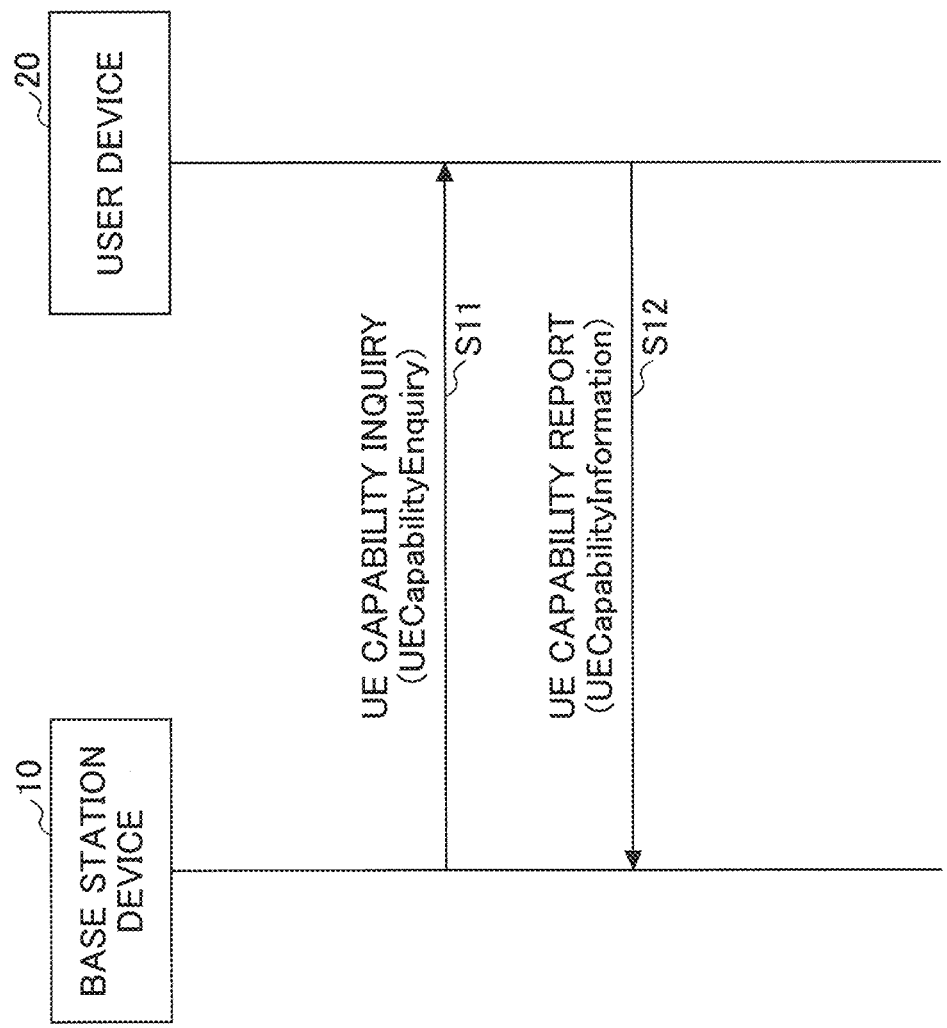

FIG. 3

RF-Parameters

The IE *RF-Parameters* is used to convey RF-related capabilities for NR operation.

*RF-Parameters information element*

```
-- ASN1START
-- TAG-RF-PARAMETERS-START

RF-Parameters ::=              SEQUENCE {
    supportedBandListNR                SEQUENCE (SIZE (1..maxBands)) OF BandNR,
    supportedBandCombinationList       BandCombinationList                    OPTIONAL,
    appliedFreqBandListFilter          FreqBandList                           OPTIONAL,
    ...
}

BandNR ::=                     SEQUENCE {
    bandNR                             FreqBandIndicatorNR,
    modifiedMPR-Behaviour              BIT STRING (SIZE (8))                  OPTIONAL,
    mimo-ParametersPerBand             MIMO-ParametersPerBand                 OPTIONAL,
    extendedCP                         ENUMERATED {supported}                 OPTIONAL,
    multipleTCI                        ENUMERATED {supported}                 OPTIONAL,
    bwp-WithoutRestriction             ENUMERATED {supported}                 OPTIONAL,
    bwp-SameNumerology                 ENUMERATED {upto2, upto4}              OPTIONAL,
    bwp-DiffNumerology                 ENUMERATED {upto4}                     OPTIONAL,
    crossCarrierScheduling-SameSCS     ENUMERATED {supported}                 OPTIONAL,
    pdsch-256QAM-FR2                   ENUMERATED {supported}                 OPTIONAL,
    pusch-256QAM                       ENUMERATED {supported}                 OPTIONAL,
    ue-PowerClass                      ENUMERATED {pc1, pc2, pc3, pc4}        OPTIONAL,
    rateMatchingLTE-CRS                ENUMERATED {supported}                 OPTIONAL,
```

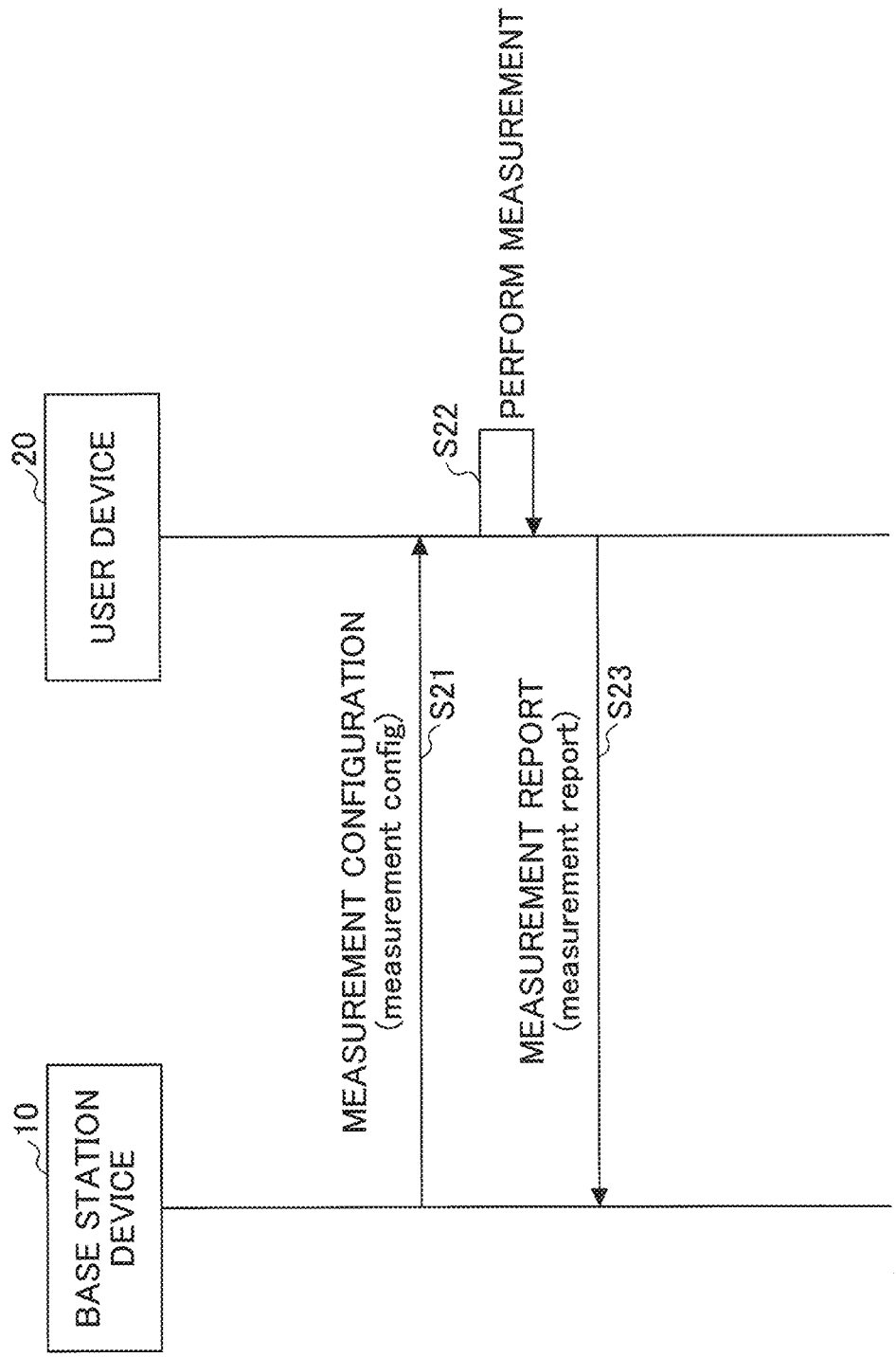

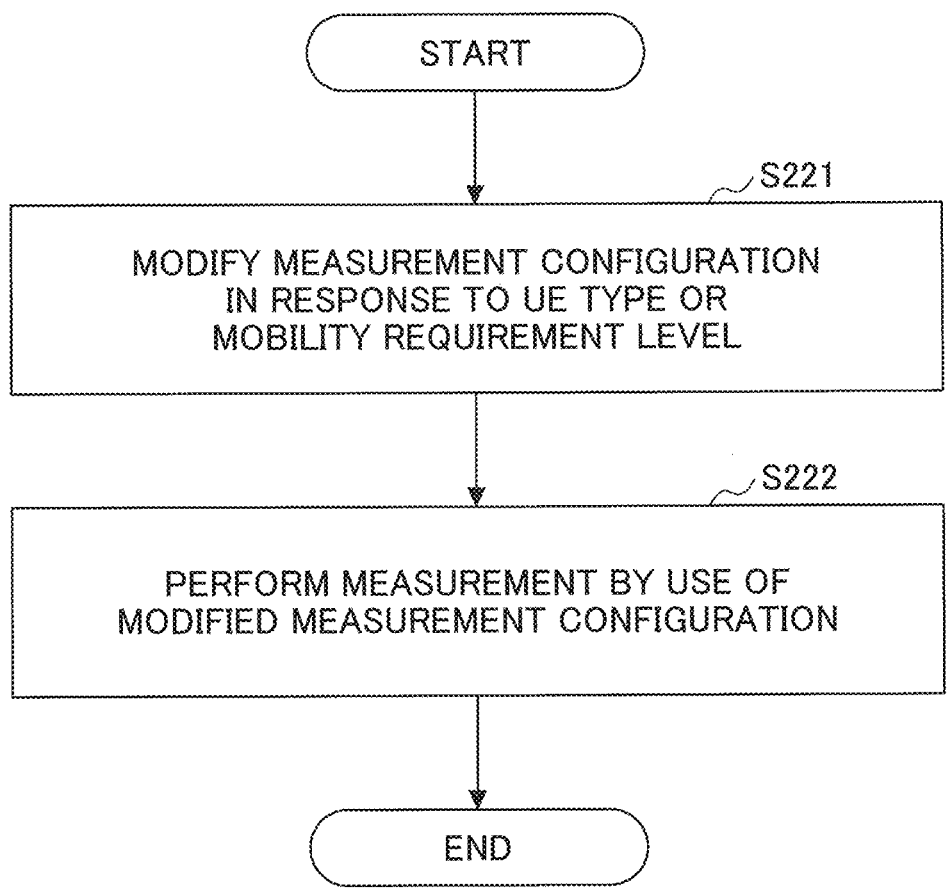

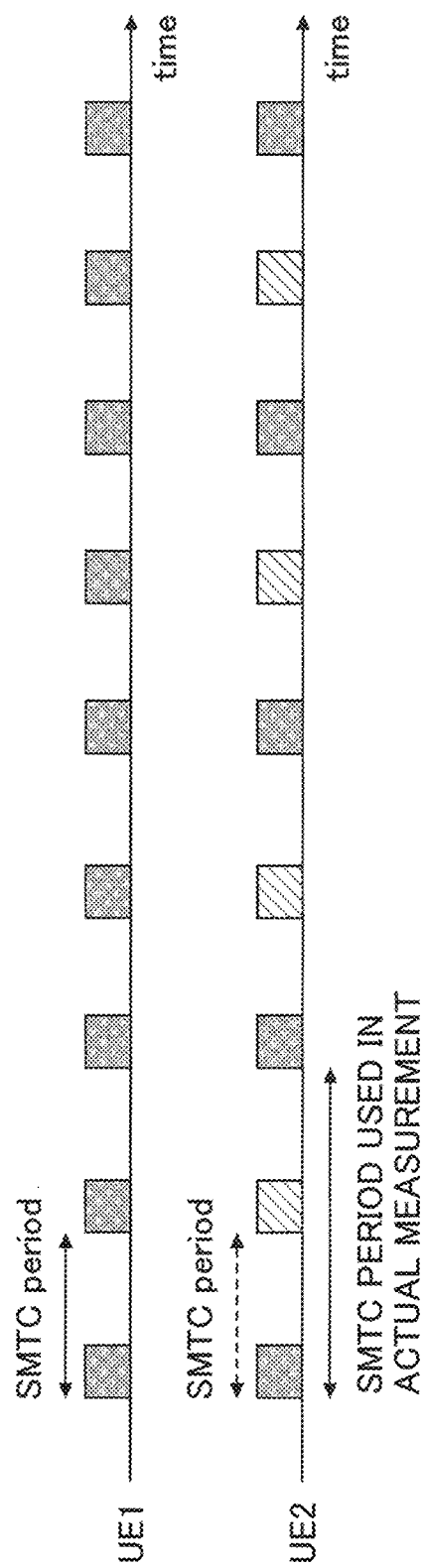

USER DEVICE AND BASE STATION DEVICE

TECHNICAL FIELD

The present invention relates to a user device and a base station device in a radio communication system.

BACKGROUND ART

In NR (New Radio) (which is also referred to as "5G") that is a successor system to LTE (Long Term Evolution), technology has been studied (e.g., Non-Patent Document 1) that meets the requirements, such as a requirement on a large capacity system, a requirement on a high data transmission rate, a requirement on low latency, a requirement on simultaneous connection of multiple terminals, a requirement on low cost, and a requirement on power saving.

In the NR, latency allowable between an occurrence of an event to be measured and transmission of a measurement report is specified as a requirement for the measurement of a user device (e.g., Non-Patent Document 2).

RELATED ART DOCUMENT

Non-Patent Document

Non-Patent Document 1: 3GPP TS 38.300 V15.3.0(2018-09)
Non-Patent Document 2: 3GPP TS 38.133 V15.3.0(2018-09)

SUMMARY OF THE INVENTION

Problem to be Solved by the Invention

In an NR radio communication system, the user device is to perform a measurement to meet a requirement specified in the technical specification documentation. Based on RF capability of a user device, a requirement for a measurement is specified, and it has been difficult to perform a measurement optimized according to a type of a user device, mobility capability, or combinations thereof.

The present invention has been made in view of the foregoing, and an object is to efficiently perform a measurement by a user device in a radio communication system.

Means for Solving the Problem

According to the disclosed technology, a user device is provided that includes a receiving unit that receives from a base station device a measurement configuration including a condition for triggering a measurement report; a control unit that executes a measurement based on the measurement configuration; and a transmitting unit that transmits a measurement report to the base station device when the condition for triggering a measurement report is met, wherein the control unit modifies the measurement configuration based on a parameter indicating mobility capability or a type of user device.

Advantage of the Invention

According to the disclosed technology, in a radio communication system, a user device can efficiently perform measurements.

BRIEF DESCRIPTION OF DRAWINGS

FIG. 1 is a diagram illustrating a radio communication system according to an embodiment of the present invention.

FIG. 2 is a sequence diagram illustrating an example of a report of a UE capability.

FIG. 3 is a diagram illustrating an example of a UE capability.

FIG. 4 is a sequence diagram illustrating an example of a measurement in an embodiment of the present invention.

FIG. 5 is a flowchart illustrating an example of a measurement in an embodiment of the present invention.

FIG. 6 is a diagram illustrating an example of a measurement period according to an embodiment of the present invention.

EMBODIMENTS OF THE INVENTION

Figure 7:
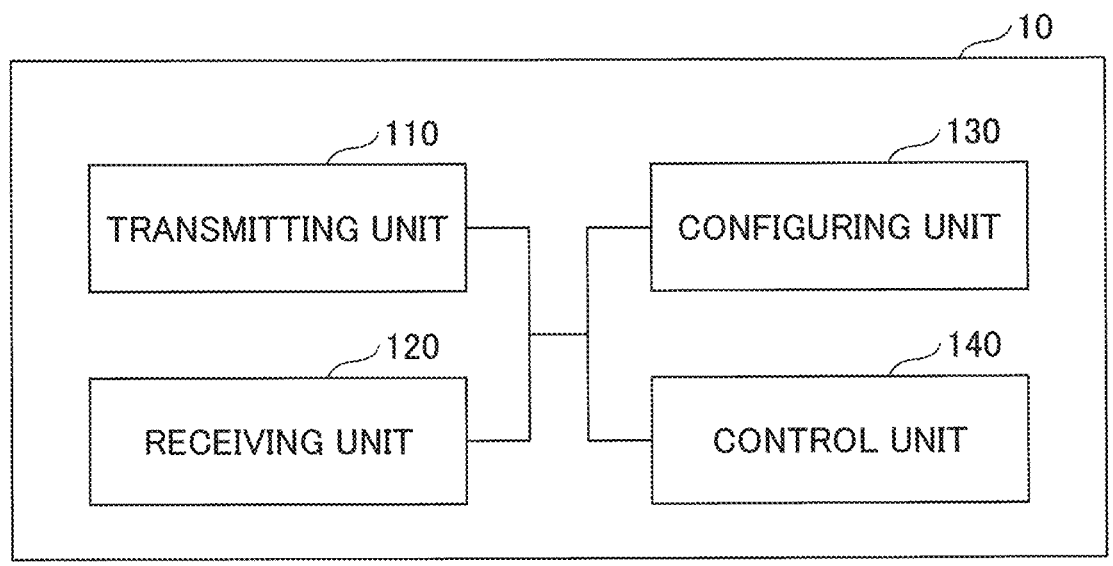
FIG. 7 is a diagram illustrating an example of a functional configuration of a base station device 10 according to an embodiment of the present invention.

The following embodiments of the present invention are described with reference to the drawings. Note that the embodiments described below are an example, and embodiments to which the present invention is applied are not limited to the following embodiments.

In an operation of a radio communication system of an embodiment of the present invention, existing technology is appropriately used. Here, the existing technology is, for example, existing LTE but is not limited to the existing LTE. Furthermore, the term "LTE" used in this specification has a broad meaning including LTE-Advanced and a system subsequent to LTE-Advanced (for example, NR), unless as otherwise specified.

In the embodiments of the present invention described below, terms used in the existing LTE are used, such as SS (Synchronization signal), PSS (Primary SS), SSS (Secondary SS), PBCH (Physical broadcast channel), PRACH (Physical random access channel), and the like. This is for convenience of description, and signals, functions, and the like, similar to these may be referred to by other names. The above-described terms in NR correspond to NR-SS, NR-PSS, NR-SSS, NR-PBCH, NR-PRACH, and the like. However, even if a signal is used for NR, the signal is not always specified as "NR-."

In the embodiments of the present invention, a duplex method may be a Time Division Duplex (TDD) method, a Frequency Division Duplex (FDD) method, or any other method (e.g., Flexible Duplex or the like).

In the following description, a method of transmitting a signal using a transmission beam may be digital beam forming of transmitting a signal multiplied by a pre-coding vector (pre-coded with a pre-coding vector) or may be analog beam forming for implementing beam forming using a variable phase shifter in a radio frequency (RF) circuit. Similarly, a method of receiving a signal using a reception beam may be digital beam forming of multiplying a received signal by a predetermined weight vector or may be analog beam forming of implementing beam forming using a variable phase shifter in a RF circuit. Hybrid beam forming in which digital beam forming and analog beam forming are combined may be applied to transmission and/or reception. Furthermore, transmitting a signal using a transmission beam may be transmitting a signal through a specific antenna port. Similarly, receiving a signal using a reception beam may be receiving a signal through a particular antenna port. An "antenna port" refers to a logical antenna port or a physical antenna port defined in the 3GPP standard. In addition, a precoding or the beam forming is also referred to as a "pre-coder," a "spatial domain filter," or the like.

A method of forming the transmission beam and the reception beam is not limited to the above-described methods. For example, in the base station device 10 or the user device 20 provided with a plurality of antennas, a method of changing an angle of each antenna may be used, a method in which a method using a precoding vector and a method of changing an angle of an antenna are combined may be used, a method of switching and using different antenna panels may be used, a method of using a combination of a plurality of antenna panels may be used, or any other method may be used. Furthermore, for example, a plurality of different transmission beams may be used in a high frequency band. Using a plurality of transmission beams is referred to as a multi-beam operation, and using a single transmission beam is referred to as a single beam operation.

In the embodiments of the present invention, "configuring" a radio parameter, or the like, may be "pre-configuring" a predetermined value, or configuring a radio parameter transmitted from a base station device 10 or a user device 20.

FIG. 1 is a diagram for illustrating a radio communication system according to an embodiment of the present invention. As illustrated in FIG. 1, the radio communication system according to the embodiment of the present invention includes the base station device 10 and the user device 20. In FIG. 1, one base station device 10 and one user device 20 are illustrated. However, this is an example, and there may be a plurality of base stations 10 and a plurality of user devices 20.

The base station device 10 provides one or more cells, and the base station device 10 is a communication device for performing radio communication with the user device 20. A physical resource of a radio signal may be defined in a time domain and a frequency domain, the time domain may be defined in terms of a number of OFDM symbols, and the frequency domain may be defined in terms of a number of subcarriers or a number of resource blocks. The base station device 10 transmits a synchronization signal and system information to the user device 20. The synchronization signal is, for example, NR-PSS and NR-SSS. The system information is transmitted, for example, on a NR-PBCH, and the system information is also referred to as broadcast information. As illustrated in FIG. 1, the base station device 10 transmits a control signal or data to the user device 20 on DL (Downlink), and the base station device 10 receives a control signal or data from the user device 20 on UL (Uplink). Each of the base station device 10 and the user device 20 can transmit and receive signals by performing beamforming.

The user device 20 is a communication device provided with a radio communication function, such as a smartphone, a cellular phone, a tablet, a wearable terminal, a communication module for M2M (Machine-to-Machine), etc. As illustrated in FIG. 1, the user device 20 utilizes various communication services provided by a radio communication system by receiving control signals or data in DL from the base station device 10 and transmitting control signals or data in UL to the base station device 10.

The user device 20 performs measurements to evaluate a communication condition. An event is specified by the base station device 10 to the user device 20 as a measurement configuration. The user device 20 transmits a measurement report to the base station device 10 when a condition on a measurement report configured by the event is satisfied. Namely, an event may be regarded as a reference for determination/factor for determination for sending a measurement report. To satisfy a condition may be referred to as a trigger.

In NR, similar to LTE, latency on measurement and a measurement period for cell detection or a RSRP (Reference Signal Received Power), as an RRM (Radio resource management) measurement, are specified. In NR, since SSB (SS/PBCH block) periodicity used for measurement can be configured from a network, a measurement is specified based on the SSB periodicity or SMTC (SS/PBCH block measurement timing configuration) periodicity.

The requirement on the measurement latency or the like in FR1 (Frequency Range 1) is defined on the basis of LTE. Whereas, the requirement on the measurement latency or the like in FR2 (Frequency Range 2) is defined on the assumption that the user device 20 performs measurement while switching analog reception beams. For example, measurement latency in FR2 is specified by "a number of samples×a factor considering reception beams (e.g., N=8)×SMTC periodicity." Table 1 illustrates an example of measurement periodicity for detecting PSS/SSS in FR2 for intra-frequency measurement without configuring a measurement gap (MG: measurement gap).

TABLE 1

| DRX cycle | $T_{PSS/SSS\_sync\_intra}$ |
|---|---|
| No DRX | max [600 ms, ceil $(M_{pss/sss\_sync\_w/o\_gaps} \times K_p \times K_{RLM}) \times$ SMTC period]$^{Note\ 1}$ |
| DRX cycle ≤320 ms | max [600 ms, ceil $(1.5 \times M_{pss/sss\_sync\_w/o\_gaps} \times K_p \times K_{RLM}) \times$ max (SMTC period, DRX cycle)] |
| DRX cycle >320 ms | Ceil $(M_{pss/sss\_sync\_w/o\_gaps} \times K_p \times KRLM) \times$ DRX cycle |
| ... | ... |

NOTE 1:
If different SMTC periodicities are configured for different cells, the SMTC period in the requirement is the one used by the cell being identified In the example in Table 1, the measurement period "$T_{PSS/SSS\_sync\_intra}$" differs depending on the DRX (Discontinuous Reception) cycle. Kp is a factor obtained by considering the overlap between MG and SMTC. $K_{RLM}$ is a factor obtained by considering the overlap between RLM-RS (Radio Link Monitoring RS) and SMTC. Here, the "$M_{PSS/SSS\_sync\_W/O\_gaps}$" shown in Table 1 indicates a number of times of transmitting a reference signal used for measurement, and a value is set according to a power class (PC: Power Class) of the user device 20. For example, "$M_{PSS/SSS\_sync\_W/O\_gaps}$" may be set to 40 for power class 1. For example, "$M_{PSS/SSS\_sync\_W/O\_gaps}$" may be set to 24 for power class 2 or 3. That is, the measurement period is specified to be changed according to the power class. The measurement period may be referred to as measurement periodicity.

In NR, four types of PCs, namely PC1, PC2, PC3, and PC4, are specified as the power class that is one item of UE capability of the user device 20. Tables 2 and 3 are tables illustrating examples of NR power classes, and Tables 2 and 3 show RF capability of the user device 20.

TABLE 2

| Operating band | Min peak EIRP (dBm) |
|---|---|
| n257 | 22.4 |
| n258 | 22.4 |
| n260 | 20.6 |
| n261 | 22.4 |

NOTE 1:
Minimum peak EIRP is defined as the lower limit without tolerance

TABLE 3

| PC | Example of UE type | TRP [dBm] Max | EIRP [dBm] | | |
|---|---|---|---|---|---|
| | | | Max peak | Min peak | Spherical |
| 1 | FWA | 35 | 55 | 40 | 32 @ 85% |
| 2 | Vehicle mounted | 23 | 43 | 29 | 18 @ 60% |
| 3 | Handheld UE | 23 | 43 | 22.4 | 11.5 @ 50% |
| 4 | FWA/high power mobile type UE | 23 | 43 | 34 | 25 @ 20% |

Table 2 is an example in which the minimum peak EIRP (Equivalent Isotropic Radiated Power) (Min peak EIRP) is specified for Power3. The minimum peak EIRP indicates the lower limit value of power radiation in the peak direction. As shown in Table 2, the minimum peak EIRP is specified for each operating band.

Table 3 is an example in which the values for the UE type, the TRP (Total Radiated Power), and the EIRP are specified for each of Power classes 1 to 4. The values are in units of dBm. As shown in Table 3, for the power class 1, the example of the UE type is "FWA (Fixed Wireless Access)," the maximum TRP is "35," the maximum peak EIRP is "55," the minimum peak EIRP is "40," and the space coverage is "32" at 85 percentile in CDF (Cumulative Distribution Function). Furthermore, as shown in Table 3, for the power class 2, the example of the UE type is "Vehicle mounted," the maximum TRP is "23," the maximum peak EIRP is "43," the minimum peak EIRP is "29," and the space coverage is "18" at 60 percentile in CDF. Furthermore, as shown in Table 3, for the power class 3, the example of the UE type is "Handheld UE," the maximum TRP is "23," the maximum peak EIRP is "43," the minimum peak EIRP is "22.4," and the space coverage is "11.5" at 50 percentile in CDF. Furthermore, as shown in Table 3, for the power class 4, the example of the UE type is "FWA/High power mobile type UE," the maximum TRP is "23," the maximum peak EIRP is "43," the minimum peak EIRP is "34," and the space coverage is "25" at 20 percentile in CDF.

FIG. 2 is a sequence diagram illustrating an example of a report of UE capability. In step S11, the base station device 10 transmits a UE Capability Enquiry to the user device 20. The UE capability query may include information indicating which UE capability report is required. Subsequently, the user device 20 transmits a UE Capability report (UE Capability Information) to the base station device 10.

FIG. 3 is a diagram illustrating an example of UE capacity. The "RF-Parameters" illustrated in FIG. 3 is an information element used for transmitting UE capability related to RF in NR operation from the user device 20 to the base station device 10. As illustrated in FIG. 3, the "RF-Parameters" include capability supported on a per-band basis. The above-described "ue-PowerClass" is defined as pc1, pc2, pc3, and pc4.

As described above, the power class is a classification for identifying the RF capability of the user device 20. The RF capability specifies expected antenna gain, transmission power, a spatial range within which certain radiating power is to be satisfied, and the like. Accordingly, the Power class does not include an index indicating mobility capability. For example, while power class 4 applies to both handheld UE and FWA devices, the required mobility capability differs between handheld UE and FWA devices. Accordingly, in the current technical specification documentation, requirements are defined that can be met from a perspective of antenna capability of the user device (e.g., with an assumed number of antennas), and mobility capability to be considered is not sufficiently ensured. Note that the mobility capability can be interpreted to be, but not limited to, capability indicating an extent of moving velocity required for the user device 20 (not moving (i.e., fixed), moves at low speed, moves at high speed, moving speed is not constant (a user device that does not move temporarily or that may move at high speed), or the like).

Furthermore, there is no capability signaling or the like for identifying a UE type or mobility capability, and an appropriate network configuration or an appropriate requirement may be unable to be applied on a per user device 20 basis. For example, when high mobility capability is required, a shorter measurement period is unable to be set compared to that of a case in which low mobility capability is required. Accordingly, to meet more stricter RF capability, a specified value on mobility capability is to be mitigated or priority of mobility capability is to be lowered.

In the current NR technical specification documentation, an SMTC window for determining a measurement period can be configured only on a per carrier basis. Accordingly, even if the user device 20 transmits the RF capability, the UE type, or the like to a network, it is difficult for the network to optimize, in addition to the RF capability of the user device 20 and/or separated from the RF capability, a configuration according to the mobility capability or the UE type, and combinations thereof.

Accordingly, by applying an appropriate capability requirement or by implementing an optimum network control, depending on a UE type, mobility capability of the UE, or combination thereof, or depending on the mobility capability required for a network environment, both the mobility capability and any other required capability, such as the RF capability, can be met. The radio communication system according to an embodiment of the present invention adopts an operation, such as the operations in 1) and 2) described below. Note that the "mobility capability of the UE" is said to be the mobility capability required depending on an operation method at the UE side, e.g., whether a mobile terminal is a terminal such as a smartphone or a fixed terminal, such as a router. The "mobility capability required for the network environment" is said to be the mobility capability required depending on a network environment, e.g., whether the network environment is a high speed moving environment, such as that of a train, or the network environment is that of a limited area, such as a stadium.

1) A requirement is applied that differs depending on a UE type, mobility capability of the UE (in the following, the "mobility capability" may be replaced with "require level of mobility"), a combination thereof, or mobility capability required in a network environment. The following are the targets of the different requirements:

1-1) a requirement on measurement; and
1-2) another requirement on terminal capability.

2) An operation of a network or a control of a network is modified depending on a UE type, mobility capability of the UE, a combination thereof, or mobility capability required in a network environment.

The above-described 1-1), 1-2), and 2) may be applied independently, or two or more of the above-described 1-1), 1-2), and 2) may be applied in combination.

FIG. 4 is a sequence diagram for illustrating an example of a measurement in an embodiment of the present invention. In the following, the above-described 1-1) is described. As illustrated in FIG. 4, in an embodiment of the present invention, a measurement report is transmitted from the user device 20 to the base station device 10.

In step S21, the base station device 10 transmits information on a measurement configuration to the user device 20. The information on the measurement configuration includes an event. Subsequently, in step S22, the user device 20 performs a measurement based on the received information on the measurement configuration. Subsequently, in step S23, upon detecting that a condition on a measurement result configured by the event is met, the user device 20 transmits a measurement report to the base station device 10.

The measurement result may be signal strength (e.g., RSRP or the like), or signal quality (e.g., RSRQ (Reference Signal Received Quality), SINR (Signal to Interference plus Noise power Ratio), or the like). Furthermore, the measurement result may be specified for any layer. For example, a layer may be layer 1 or layer 3. Furthermore, a sample corresponding to the measurement result may be a single sample or a sample obtained by filtering a plurality of samples.

FIG. 5 is a flowchart for illustrating an example of a measurement according to an embodiment of the present invention. Using FIG. 5, details of the operation in step S22 are described. In step S221, the user device 20 applies a requirement on measurement latency that differs depending on, not only a power class, but also a UE type or mobility capability of the user device 20. Alternatively, the user device 20 may apply a requirement on measurement latency that differs depending on a UE type or mobility capability of the user device 20, or a combination thereof, without referring to a power class. Subsequently, the user device 20 performs the measurement based on the applied measurement latency (S222). A "parameter indicating mobility capability of a UE" may be distinguished by a specific condition described in a specification, or may be distinguished by a signaling signaled from a network or the user device 20.

The specific condition described in the specification for distinguishing the mobility capability may be a), b), and/or c) described below:

a) a reference signal used for a measurement, i.e., a setting value on SSB or CSI-RS;

b) a measurement window, i.e., a setting value on a SMTC window; and c) a type or purpose of measurement, e.g., whether the measurement is for a serving cell or the measurement is for a neighboring cell.

The following a)-d) may be applied to the signaling for distinguishing the mobility capability signaled from the network or the user device 20:

a) UE capability or signaling from the network for distinguishing or indicating mobility capability, a UE type, or a combination thereof;

b) UE capability or signaling from the network for distinguishing or indicating beam capability of the UE, e.g., a number of antennas, a number of beams, analog beam forming/digital beam forming, and the like;

c) signaling for indicating mobility capability required by a network (e.g., high speed moving environment or the like) to the UE; and d) UE capability or signaling from a network for a function directed to a specific application (e.g., URLLC (Ultra-Reliable and Low Latency Communications) or power saving).

The above-described a)-d) may be applied not only to the received quality measurement of the own cell and neighboring cells, but also to functions related to connectivity with the connected cell, such as RLM, beam management (link recovery procedure, beam failure detection, beam candidate detection, L1-RSRP measurement/report), and the like.

For example, a requirement to be applied may be changed assuming that a beam or time for measurement used by the user device 20 differs between a measurement for a serving cell and a measurement for a neighboring cell. For a measurement of a serving cell, a number of times of measurements that is smaller than that of a neighboring cell may be applied, as a factor for which a reception beam is considered, so that the measurement is completed in a shorter time than the measurement for the neighboring cell. By applying different configurations to a measurement for a serving cell and a measurement for a neighboring cell, it is possible to avoid spending unnecessary time for a measurement of a serving cell.

Furthermore, for example, a requirement to be applied to may be distinguished by defining, in addition to a power class of the user device 20, mobility capability or UE capability indicating a type of a UE. The mobility capability may include, for example, low mobility, middle mobility, high mobility, and the like. A UE type may include, for example, FWA, Vehicle mounted, smartphone, wearable, laptop, and the like. By using UE capability indicating a type of a UE, for example, power class 4 FWA and a power class 4 smartphone can be distinguished. UE capability may be defined by combining mobility capability and a UE type.

In the following, the above-described 1-2) is described. As a requirement on terminal capability, a power class including UE capability other than RF capability is defined. A power class including UE capability other than RF capability may be a new requirement that differs from an existing power class, or may be defined by extending or modifying an existing requirement. As a power class including mobility capability, an existing power class, i.e., PC1, PC2, PC3, and PC4, may be applied, or a new power class may be defined.

UE capability other than RF capability may include mobility capability. For defining a power class including mobility capability, different power classes may be defined for the user devices 20 that satisfy the same level of RF capability while satisfying different types of mobility capability. For example, classifications for mobility capability may be defined, and different power classes may be defined for the classifications. The classifications for mobility capability may be classifications for distinguishing two or more types of mobility capability, such as high mobility, middle mobility, and low mobility. Note that, as the RF capability, at least one of the minimum peak EIRP, the maximum peak EIRP, EIRP representing spatial coverage, or the maximum TRP may be applied.

For the above-described power classes including the mobility capability, different requirements on measurement latency may be applied.

As a specific example, a requirement of an existing power class may be extended to include mobility capability. Information indicating mobility capability of the user device 20 may be added to the existing PC1, PC2, PC3, and PC4. For example, PC1 with low mobility, PC1 with middle mobility, and PC1 with high mobility may be defined. Similarly, information indicating low mobility, middle mobility, and high mobility may be added to PC2, PC3, and PC4. Different requirements on a measurement may be applied to the above-described extended power classes.

In the following, the above-described 2) is described. A network operation on mobility capability or a setting value from a network is modified depending on mobility capability or a UE type of the user device 20. The mobility capability or the UE type of the user device 20 may be the above-described mobility capability or the UE type, or may be newly defined for modifying the network operation on the mobility capability or the setting value from the network. For modifying the network operation on the mobility or the setting value, for example, an operation described in a), b), or c) below may be applied. Furthermore, the following may be implemented by combining the mobility capability and the UE type.

a) Measurement periodicity to be assumed by the user device 20 may be modified depending on mobility capability. For example, a network may configure an indication of an SMTC window configuration (a part of periodicity, an offset, and a period; or all the periodicity, the offset, and the period) on a per user device 20 basis. Furthermore, for example, in addition to the SMTC window configuration, the network may configure a parameter for modifying a measurement operation on a per user device 20 basis. The parameter may be, for example, a part of: a ratio of actually executing a measurement, a ratio of omitting a measurement, periodicity or a period for actually executing a measurement, and periodicity or a period for omitting a measurement; or all of: the ratio of actually executing the measurement, the ratio of omitting the measurement, the periodicity or the period for actually executing the measurement, and the periodicity or the period for omitting the measurement. Note that, instead of the above-described SMTC window, a window specifying a CSI-RS or a timing of a measurement using a CSI-RS may be used. Namely, a network may configure an indication of a configuration of a window for a CSI-RS on a per user device 20 basis, or the network may configure, in addition to the configuration of the window for the CSI-RS, a parameter for modifying a measurement operation on a per user device 20 basis.

b) A network may configure, for the user device 20, an operation or a setting value on a report on a measurement result (measurement report) of the user device 20. For example, a modification of a number of cells to be measured or reported, a number of beams, or a number of carriers may be configured.

c) A network may configure, for the user device 20, a setting value on a function for connectivity with a connected cell, such as RLM and beam management (link recovery procedure, beam failure detection, beam candidate detection, L1-RSRP measurement/reporting). For example, a number of resources, a number of beams, and periodicity used for RLM and beam management may be configured. Furthermore, for example, a measurement period for executing RLM and beam management, and a reference for determination of synchronous/asynchronous/failure occurrence may be modified.

FIG. 6 is a diagram for illustrating an example of measurement periodicity in an embodiment of the present invention. As in the above-described a), a network may cause the user device 20 to omit a measurement depending on mobility capability, a UE type, or a combination thereof. For example, as illustrated in FIG. 6, a network may configure a SMTC with short periodicity for a UE1 for which mobility is emphasized, such as that of high mobility, and the network may configure elongated SMTC periodicity for a UE2 for which mobility is not emphasized, such as that of low mobility. FIG. 6 is an example in which a network configures, for the UE2, SMTC periodicity that is two times as long as the SMTC periodicity applied to the UE1. Namely, the UE2 may execute a measurement at a ratio equivalent to once per every two measurements performed by the UE1.

Note that, for the operation illustrated in FIG. 6, the user device 20 may autonomously select SMTC periodicity, modify SMTC periodicity actually used for a measurement, or omit a measurement based on the mobility capability of the own device, without configuring the user device 20 by the network.

With the above-described embodiments, the user device 20 can execute a measurement optimized based on UE capability other than RF capability by applying a measurement configuration depending on mobility capability, a UE type, or a combination thereof.

Namely, in a radio communication system, a user device can efficiently execute a measurement.

(Device Configurations)

Next, examples of functional configurations of the base station device 10 and the user device 20 for executing the above-described processing and operation are described. The base station device 10 and the user device 20 include functions for executing the above-described embodiments. However, each of the base station device 10 and the user device 20 may instead provide only a part of the functions in the embodiments.

<Base Station Device 10>

FIG. 7 is a diagram illustrating an example of a functional configuration of the base station device 10. As illustrated in FIG. 7, the base station device 10 includes a transmitting unit 110; a receiving unit 120; a configuring unit 130; and a control unit 140. The functional configuration illustrated in FIG. 7 is merely an example. Functional division and names of functional units may be any division and names, provided that operation according to the embodiments of the present invention can be executed.

The transmitting unit 110 includes a function for generating a signal to be transmitted to the user device 20 and transmitting the signal through radio. The receiving unit 120 includes a function for receiving various signals transmitted from the user device 20 and retrieving, for example, information of a higher layer from the received signals. The transmitting unit 110 has a function to transmit NR-PSS, NR-SSS, NR-PBCH, NR-CSI-RS, DL/UL control signals, and the like, to the user device 20.

The configuring unit 130 stores preconfigured configuration information and various types of configuration information to be transmitted to the user device 20 in a storage device and reads the configuration information from the storage device if necessary. For example, content of the configuration information is, for example, information on a measurement of the user device 20, and the like.

As described in the embodiments, the control unit 140 performs a process of generating a configuration of a measurement by the user device 20. Furthermore, the control unit 140 performs communication control based on a measurement report obtained from the user device 20. A functional unit related to signal transmission in the control unit 140 may be included in the transmitting unit 110, and a functional unit related to signal reception in the control unit 140 may be included in the receiving unit 120.

<User Device 20>

Figure 8:
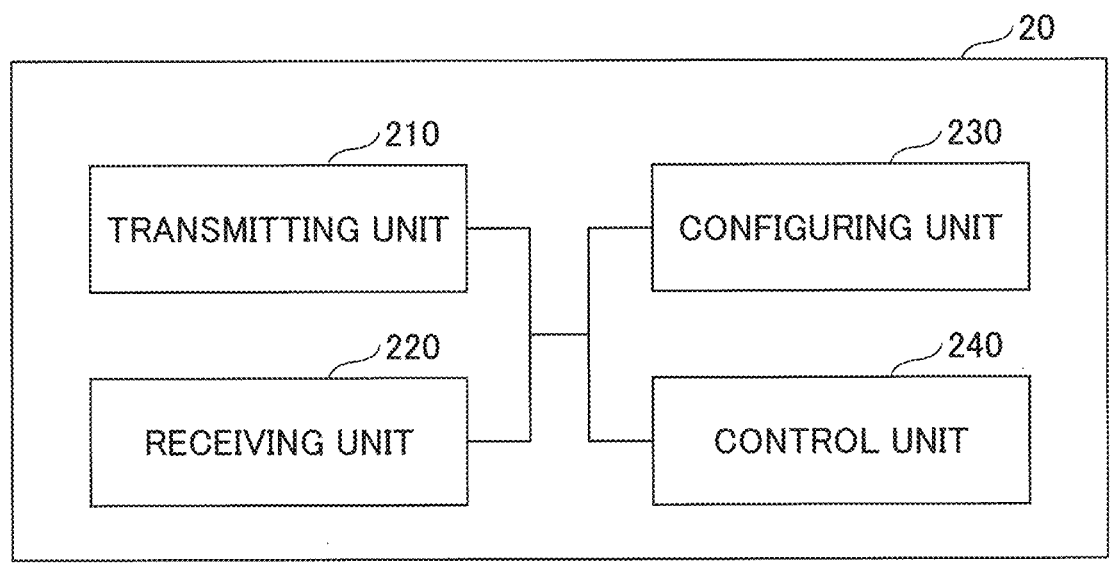
FIG. 8 is a diagram illustrating an example of a functional configuration of a user device 20 according to an embodiment of the present invention.

FIG. 8 is a diagram illustrating an example of a functional configuration of the user device 20. As illustrated in FIG. 8, the user device 20 has a transmitting unit 210, a receiving unit 220, a configuring unit 230, and a control unit 240. The functional configuration illustrated in FIG. 8 is merely an example. Functional division and names of functional units may be anything, provided that operation according to the embodiments of the present invention can be executed.

The transmitting unit 210 generates a transmission signal from transmission data and transmits the transmission signal through radio. The receiving unit 220 receives various types of signals through radio, and retrieves a signal of a higher layer from a received signal of a physical layer. The receiving unit 220 also has a function of receiving the NR-PSS, the NR-SSS, the NR-PBCH, the NR-CSI-RS, the DL/UL/SL control signals, or the like transmitted from the base station device 10. Furthermore, for example, the transmitting unit 210 may transmit a physical sidelink control channel (PSCCH), a physical sidelink shared channel (PSSCH), a physical sidelink discovery channel (PSDCH), a physical sidelink broadcast channel (PSBCH), and the like to another user device 20 as the D2D communication, and the receiving unit 120 receives the PSCCH, the PSSCH, the PSDCH, the PSBCH, and the like from another user device 20.

The configuring unit 230 stores various types of configuration information received from the base station device 10 or the user device 20 through the receiving unit 220 in the storage device and reads the configuration information from the storage device if necessary. The configuring unit 230 also stores pre-configured configuration information. For example, content of the configuration information is information on measurement by the user device 20 or the like.

The control unit 240 performs measurement based on the configuration on measurement obtained from the base station device 10. Furthermore, the control unit 240 reports a measurement report to the base station device 10. A functional unit related to signal transmission in the control unit 240 may be included in the transmitting unit 210, and a functional unit related to signal reception in the control unit 240 may be included in the receiving unit 220.

<Hardware Configuration>

The block diagrams (FIG. 7 and FIG. 8) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 9:
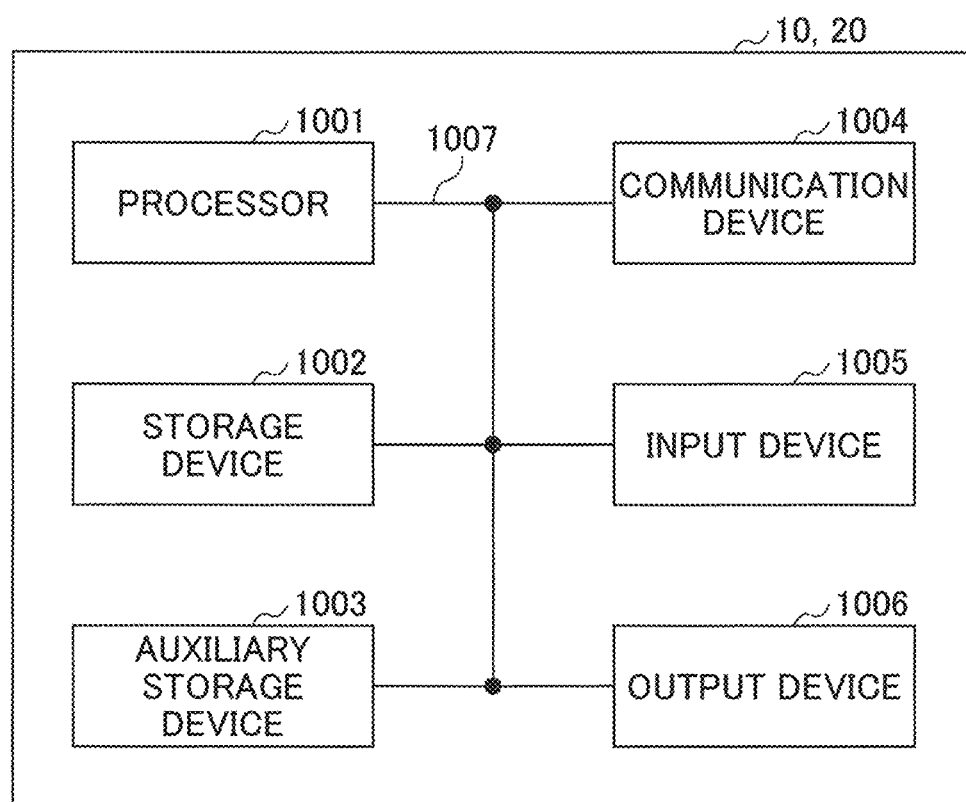
FIG. 9 is a diagram illustrating an example of a hardware configuration of a base station device 10 or a user device 20 in an embodiment of the present invention.

For example, the base station device 10, the user device 20, or the like in an embodiment of the present invention may function as a computer for performing a process of radio communication method according to the present disclosure. FIG. 9 is a diagram illustrating an example of a hardware configuration of the base station device 10 and the user device 20 according to an embodiment of the present disclosure. Each of the base station device 10 and the user device 20 described above may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station device 10 and the user device 20 may be configured to include each device depicted, or may be configured without including some devices.

Each function in each of the base station device 10 and the user device 20 is implemented such that predetermined software (program) is read on hardware such as the processor 1001, the storage device 1002 and the like, and the processor 1001 performs an operation and controls communication by the communication device 1004 and at least one of reading and writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the above-described control unit 140, the control unit 240, and the like may be implemented by the processor 1001.

Furthermore, the processor 1001 reads a program (program code), a software module, data, or the like from at least one of the auxiliary storage device 1003 and the communication device 1004 out to the storage device 1002, and executes various types of processes according to them. A program causing a computer to execute at least some of the operations described in the above embodiments is used as the program. For example, the control unit 140 of the base station device 10 illustrated in FIG. 7 may be implemented by a control program which is stored in the storage device 1002 and operates on the processor 1001. Furthermore, for example, the control unit 240 of the user device 20 illustrated in FIG. 8 may be implemented by a control program which is stored in the storage device 1002 and operates on the processor 1001. Various types of processes are described to be executed by one processor 1001 but may be executed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The auxiliary storage device 1003 is also referred to as an "auxiliary storage device." The above-described storage medium may be, for example, a database, a server, or any other appropriate medium including at least one of the storage device 1002 and the auxiliary storage device 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD). For example, transmitting and receiving antennas, an amplifier, a transceiver, a transmission line interface, and the like may be implemented by the communication device 1004. The transceiver may be implemented such that a transmitter and a receiver are physically or logically separated.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the storage device 1002 are connected by the bus 1007 to communicate information with each other. The bus 1007 may be configured with a single bus or may be configured with different buses between the devices.

Furthermore, each of the base station device 10 and the user device 20 may be configured to include hardware such as a microprocessor, a digital signal processor (DSP), an application specific integrated circuit (ASIC), a programmable logic device (PLD), or a field programmable gate array (FPGA), or all or some of the functional blocks may be implemented by hardware. For example, the processor 1001 may be implemented by at least one of these pieces of hardware.

Conclusion of the Embodiments

As described above, according to the embodiments of the present invention, there is provided a user device including a receiving unit that receives from a base station device a measurement configuration including a condition for triggering a measurement report; a control unit that executes a measurement based on the measurement configuration; and a transmitting unit that transmits a measurement report to the base station device in response to the condition for triggering a measurement report being met, wherein the control unit modifies the measurement configuration based on a parameter indicating mobility capability or based on a type of user device.

With the above-described configuration, by applying a measurement configuration depending on mobility capability, the user device 20 can execute a measurement optimized based on UE capability other than the RF capability. Namely, in the radio communication system, the user device can efficiently execute a measurement.

The control unit may modify a setting value of a SS/PBCH block measurement timing configuration (SMTC) window based on the parameter indicating the mobility capability.

When a parameter indicating first mobility capability and a parameter indicating second mobility capability that differs from the mobility capability indicated by the parameter indicating the first mobility capability are to be applied to the measurement, the control unit may set a setting value of a SMTC window configured based on the parameter indicating the first mobility capability and a setting value of a SMTC window configured based on the parameter indicating the second mobility capability so as to be different from each other. With this configuration, the user device 20 can enhance the efficiency of the measurement by enlarging the measurement periodicity for low mobility capability. Note that the setting value of the SMTC window can be set to 0. Namely, the measurement can be omitted. Furthermore, by not setting a setting value of the SMTC window, instead of explicitly setting the setting value to 0, the measurement may be omitted. Not setting a setting value may be interpreted from a rule of setting a setting value of a SMTC window configured based on the parameter indicating the first mobility capability and a setting value of a SMTC window configured based on the parameter indicating the second mobility capability to be different from each other.

Furthermore, for example, when a parameter indicating first mobility capability and a parameter indicating second mobility capability that is lower than the first capability indicated by the parameter, the control unit may reduce a number of times of the measurement executed based on the parameter indicating the second mobility capability compared to a number of times of the measurement executed based on the parameter indicating the first mobility capability. Namely, the user device 20 may omit a measurement by reducing a number of times of a measurement, for lower mobility capability.

The transmitting unit may transmit, to the base station device, the parameter indicating the mobility capability, as a terminal capability report. With this configuration, the user device 20 can indicate the mobility capability to the base station device 10.

The terminal capability report may include a case in which parameters indicating different types of mobility capability are associated with a same power class. With this configuration, the user device 20 can indicate, to the base station device 10, that, even if the power class is the same, the mobility capability differs.

According to the embodiments of the present invention, there is provided a base station device including a receiving unit that receives, from a user device, at least one of a parameter indicating mobility capability or a type of the user device, as a terminal capability report; a control unit that generates a measurement configuration based on at least one of the parameter indicating the mobility capability or the type of the user device; and a transmitting unit that transmits, to the user device, the measurement configuration including a condition for triggering a measurement report.

With the above-described configuration, by applying a measurement configuration depending on mobility capability, the user device 20 can execute a measurement optimized based on UE capability other than the RF capability.

Namely, in the radio communication system, the user device can efficiently execute a measurement.

Supplemental Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station device 10 and the user device 20 are described using the functional block diagrams, but such devices may be implemented by hardware, software, or a combination thereof. Software executed by the processor included in the base station device 10 according to the embodiment of the present invention and software executed by the processor included in the user device 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any other appropriate storage medium.

Furthermore, a notification of information is not limited to the aspect or embodiment described in the present disclosure and may be provided by any other method. For example, the notification of information may be given by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4G (4th generation mobile communication system), 5G (5th generation mobile communication system), Future Radio Access (FRA), NR (new Radio), W-CDMA (registered trademark), GSM (registered trademark), CDMA 2000, Ultra Mobile Broadband (UMB), IEEE 802.11 (Wi-Fi(registered trademark)), IEEE 802.16 (WiMAX(registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in this specification may be reversed in order provided that there is no contradiction. For example, the method described in the present disclosure presents elements of various steps with an exemplary order and is not limited to a presented specific order.

In this specification, a specific operation to be performed by the base station device 10 may be performed by an upper node in some cases. In the network including one or more network nodes including the base station device 10, various operations performed for communication with the user device 20 can be obviously performed by at least one of the base station device 10 and any network node (for example, an MME, an S-GW, or the like is considered, but it is not limited thereto) other than the base station device 10. A case is exemplified above in which there is one network node other than the base station device 10. The one network node may be a combination of a plurality of other network nodes (e.g., MME and S-GW).

Information, a signal, or the like described in the present disclosure may be output from a higher layer (or a lower layer) to a lower layer (or a higher layer layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination in the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in the present disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS)," "radio base station," "base station device," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base station and the mobile station may be also referred to as a transmitting device, a receiving device, a communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not necessarily move during a communication operation.

For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of units of user device 20 (for example, which may be referred to as device-to-device (D2D) or vehicle-to-everything (V2X)). In this case, the user device 20 may have the functions of the base station device 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station may have the functions of the above-mentioned user terminal.

The term "determining" used in the present disclosure may include a wide variety of actions. For example, "determining" may include, for example, events in which events such as judging, calculating, computing, processing, deriving, investigating, looking up, search, and inquiry (for example, looking up in a table, a database, or another data structure), or ascertaining are regarded as "determining." Further, "determining" may include, for example, events in which events such as receiving (for example, receiving information), transmitting (for example, transmitting information), input, output, or accessing (for example, accessing data in a memory) are regarded as "determining." Further, "determining" may include, for example, events in which events such as resolving, selecting, choosing, establishing, or comparing are regarded as "determining." In other words, "determining" may include events in which a certain operation is regarded as "determining." Further, "determining" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be replaced with "unit," "circuit," "device," or the like.

When "include," "including," and variations thereof are used in the present disclosure, these terms are intended to be comprehensive, similar to a term "provided with (comprising)." Further, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of allocating a radio resource (a frequency bandwidth, a transmission power, or the like which can be used in each user device 20) to each user device 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is provided, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Further, a long TTI (for example, a normal TTI, a subframe, or the like) may be replaced with a TTI having a time length exceeding 1 ms, and a short TTI (for example, a reduced TTI or the like) may be replaced with a TTI having a TTI length that is less than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Further, a time domain of an RB may include one or more symbols and may be a length of one slot, one mini slot, one subframe, or one TTI. One TTI, one subframe, or the like may be formed of one or more resource blocks.

Further, one or more RBs may be referred to as a physical resource block (PRB), a sub carrier group (SCG), a resource element group (REG), a PRB pair, an RB pair, or the like.

Further, the resource block may be formed of one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and the UE need not assume that predetermined signals/channels are transmitted and received outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the present disclosure, for example, when an article such as "a," "an," or "the" in English is added by a translation, the present disclosure may include a case in which a noun following the article is the plural.

In the present disclosure, a term "A and B are different" may mean "A and B are different from each other." Further, the term may mean "each of A and B is different from C." Terms such as "separated," "coupled," or the like may also be interpreted similarly to "different."

Each aspect/embodiment described in the present disclosure may be used alone, in combination, or may be switched in accordance with the execution. Further, notification of predetermined information (for example, notification of "being X") is not limited to being performed explicitly, but may be performed by implicitly (for example, not notifying the predetermined information).

Although the present disclosure is described above in detail, it is obvious to those skilled in the art that the present disclosure is not limited to the embodiments described in the present disclosure. The present disclosure may be implemented as revised and modified embodiments without departing from the gist and scope of the present disclosure as set forth in claims. Accordingly, the description of the present disclosure is for the purpose of illustration and does not have any restrictive meaning to the present disclosure.

LIST OF REFERENCE SYMBOLS 10 base station device
110 transmitting unit
120 receiving unit
130 configuring unit
140 control unit
20 user device
210 transmitting unit
220 receiving unit
230 configuring unit
240 control unit
1001 processor
1002 storage device
1003 auxiliary storage device
1004 communication device
1005 input device
1006 output device

The invention claimed is:

1. A terminal comprising:
a receiver that receives, from a base station, information on a measurement configuration;
a processor that modifies periodicity of a measurement of a cell based on a requirement on measurement, the requirement on measurement depending on mobility capability of the terminal and a discontinuous reception (DRX) cycle; and
a transmitter that transmits a report on the measurement to the base station.

2. The terminal of claim 1, wherein, when the requirement on measurement depending on the mobility capability is satisfied, the processor enlarges the periodicity of the measurement.

3. A base station comprising:
a transmitter that transmits, to a terminal, information on a measurement configuration; and
a receiver that receives, from the terminal, a report on a measurement for which periodicity of the measurement of a cell is modified based on a requirement on measurement, the requirement on measurement depending on mobility capability of the terminal and a discontinuous reception (DRX) cycle.

4. A radio communication system comprising:
a terminal including:
a first receiver that receives, from a base station, information on a measurement configuration;
a processor that modifies periodicity of a measurement of a cell based on a requirement on measurement, the requirement on measurement depending on mobility capability of the terminal and a discontinuous reception (DRX) cycle; and
a first transmitter that transmits a report on the measurement to the base station; and
a base station including:
a second transmitter that transmits, to the terminal, the information on the measurement configuration; and
a second receiver that receives, from the terminal, the report on the measurement.

5. A communication method executed by a terminal, the method comprising:
receiving, from a base station, information on a measurement configuration;
modifying periodicity of a measurement of a cell based on a requirement on measurement, the requirement on measurement depending on mobility capability of the terminal and a discontinuous reception (DRX) cycle; and
transmitting a report on the measurement to the base station.

* * * * *